US012686634B2

(12) United States Patent
Ko et al.

(10) Patent No.: US 12,686,634 B2
(45) Date of Patent: Jul. 21, 2026

(54) APPARATUS FOR MANUFACTURING GLASS ARTICLE AND METHOD FOR MANUFACTURING GLASS ARTICLE USING THE SAME

(71) Applicant: SAMSUNG DISPLAY CO., LTD., Yongin-si (KR)

(72) Inventors: Jihyun Ko, Yongin-si (KR); Minki Kim, Yongin-si (KR); Jinsu Nam, Yongin-si (KR); Jun Ho Lee, Yongin-si (KR); Yongkyu Kang, Yongin-si (KR); Hyunseung Seo, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 121 days.

(21) Appl. No.: 18/427,781

(22) Filed: Jan. 30, 2024

(65) Prior Publication Data

US 2024/0254039 A1     Aug. 1, 2024

(30) Foreign Application Priority Data

Jan. 31, 2023     (KR) ........................ 10-2023-0013160

(51) Int. Cl.
      *C03C 21/00*          (2006.01)
      *C03B 23/023*        (2006.01)
(52) U.S. Cl.
      CPC ........ *C03C 21/003* (2013.01); *C03B 23/0235* (2013.01)

(58) Field of Classification Search
      CPC ................................................... C03C 21/003
      See application file for complete search history.

(56) References Cited

U.S. PATENT DOCUMENTS 3,218,220 A * 11/1965 Weber ................... C03C 21/003
                                                                    428/218
3,632,321 A * 1/1972 Plumat .................... C03C 21/00
                                                                    205/769
2015/0166407 A1* 6/2015 Varshneya ............ C03C 21/003
                                                                    428/220
2017/0334770 A1* 11/2017 Luzzato ................ C03C 21/003

FOREIGN PATENT DOCUMENTS

JP          2020200208          12/2020
KR          10-1113457          1/2012
KR          10-1750261          6/2017
KR      10-2021-0088040        7/2021
WO      WO-2018200898 A2 * 11/2018 ........... C03C 21/003

* cited by examiner

*Primary Examiner* — Erin Snelting
(74) *Attorney, Agent, or Firm* — F. CHAU & ASSOCIATES, LLC

(57) ABSTRACT

An apparatus for manufacturing a glass article includes a chamber defining an inner space that accommodates a molten salt for molding and chemical strengthening the glass article, a first electrode disposed in the inner space of the chamber and in contact with the molten salt, a second electrode disposed in the inner space of the chamber, in contact with the molten salt, and facing the first electrode, and a power supply connected to the first electrode and the second electrode.

19 Claims, 11 Drawing Sheets

S200

E1

E2

GL

D3
D1
D2

S200'

START

NOT APPLY ELECTRIC FIELD ～S210'

APPLY ELECTRIC FIELD ～S220'

END

S200"

S210"

APPARATUS FOR MANUFACTURING GLASS ARTICLE AND METHOD FOR MANUFACTURING GLASS ARTICLE USING THE SAME

CROSS-REFERENCE TO RELATED APPLICATION(S)

This application claims priority under 35 USC § 119 to Korean Patent Application No. 10-2023-0013160, filed on Jan. 31, 2023, in the Korean Intellectual Property Office (KIPO), the entire disclosure of which is incorporated by reference herein.

TECHNICAL FIELD

Embodiments relate to an apparatus for manufacturing a glass article and a method for manufacturing a glass article using the same.

DISCUSSION OF RELATED ART

Glass may be used in a verity of ways and for a verity of purposes. Glass is typically an inorganic solid material. Glass may have characteristic properties including transparency, strength, pressure resistance, and chemical resistance, among others. These characteristic properties may be tuned through different manufacturing processes. These manufacturing processes may be selected to match the characteristic properties of a glass article to its application.

For example, the glass article may be used in electronic devices including display devices or building materials. In the case of a display device, the glass article may be applied to a substrate of the display device such as a liquid crystal display device, an organic light emitting display device, or a plasma display device. The glass article may be a cover window that protects a display panel of the display device.

For some applications, such as for display devices, the strength of the glass article may be improved to withstand external impact through thermal strengthening or chemical strengthening.

SUMMARY

Embodiments provide an apparatus for manufacturing a glass article with improved process efficiency.

Embodiments provide a method for manufacturing a glass article using the apparatus.

An apparatus for manufacturing a glass article according to an embodiment of the present disclosure includes a chamber defining an inner space that accommodates a molten salt for molding and chemical strengthening the glass article, a first electrode disposed in the inner space of the chamber and in contact with the molten salt, a second electrode disposed in the inner space of the chamber, in contact with the molten salt, and facing the first electrode, and a power supply connected to the first electrode and the second electrode.

In an embodiment, the power supply may apply a negative voltage to the first electrode, and may apply a positive voltage to the second electrode.

In an embodiment, the molten salt may include at least one of sodium nitrate ($NaNO_3$) or potassium nitrate ($KNO_3$).

In an embodiment, a planar area of the first electrode and a planar area of the second electrode may be both greater than or equal to a planar area of the glass article.

In an embodiment, at least one of the first electrode or the second electrode may have a hollow rectangular planar shape.

In an embodiment, the apparatus may include a plurality of first electrodes, including the first electrode, and a plurality of second electrodes, including the second electrode, wherein the plurality of first electrodes may extend in a first direction and the plurality of second electrodes may extend in the first direction, and the plurality of first electrodes and the plurality of second electrodes may be alternately arranged along a second direction intersecting the first direction.

A method for manufacturing a glass article according to an embodiment of the present disclosure may include immersing the glass article in a molten salt disposed in an inner space of a chamber, and molding and chemical strengthening the glass article at a same time by applying an electric field to the glass article.

In an embodiment, at least one first electrode in contact with the molten salt may be disposed in the inner space of the chamber, at least one second electrode in contact with the molten salt and facing the first electrode may be disposed in the inner space of the chamber, and in the immersing the glass article, at least a portion of the glass article may be disposed between the first electrode and the second electrode.

In an embodiment, in the molding and chemical strengthening the glass article at a same time, the glass article may be bent toward the first electrode.

In an embodiment, the molding and chemical strengthening the glass article at the same time may further include, applying, by the first electrode, a negative voltage to the glass article, applying, by the second electrode, a positive voltage to the glass article, and concentrating first ions from the molten salt in at least a portion of a surface of the glass article adjacent to the first electrode.

In an embodiment, the first ions may include at least one of lithium ($Li^+$) and sodium ($Na^+$).

In an embodiment, the molding and chemical strengthening the glass article at the same time may further include exchanging second ions located in the surface of the glass article with the first ions included in the molten salt and having an ionic radius greater than an ionic radius of the second ions.

In an embodiment, the first ions may include at least one of sodium ($Na^+$) or potassium ($K^+$).

In an embodiment, an intensity of the electric field may be in a range of about 100 volts per centimeter (V/cm) to about 1500V/cm.

In an embodiment, the molten salt may include at least one of sodium nitrate ($NaNO_3$) or potassium nitrate ($KNO_3$).

In an embodiment, the molding and chemical strengthening the glass article at the same time may further include not applying the electric field to the glass article at a first time corresponding to a separate chemical strengthening, and applying the electric field to the glass article at a second time corresponding to a simultaneous molding and chemical strengthening.

In an embodiment, the molding and chemical strengthening the glass article at the same time may further include applying a first electric field to the glass article, and applying a second electric field having an intensity different than an intensity of the first electric field to the glass article.

A method for manufacturing a glass article according to an embodiment of the present disclosure may include providing a chamber defining an inner space that accommodates a molten salt and a plurality of electrodes in contact with the molten salt, chemical strengthening the glass article by immersing the glass article in the molten salt disposed in the inner space of the chamber, and generating an electric field between the plurality of electrodes, wherein the electric field produces an asymmetrical effect on the chemical strengthening of the glass article, wherein an asymmetry of ions diffused into surfaces of the glass article from the molten salt during the chemical strengthening simultaneously molds the glass article.

In an embodiment, a method may include not applying the electric field to the glass article at a first time corresponding to the chemical strengthening, wherein the generation of the electric field may be performed at a second time corresponding to the simultaneous molding and chemical strengthening of the glass article.

In an embodiment, the generation of the electric field between the plurality of electrodes may include applying a first electric field to the glass article, and applying a second electric field following the applying of the first electric field, the second electric field having an intensity different than an intensity of the first electric field to the glass article.

In an apparatus for manufacturing a glass article according to embodiments of the present disclosure, the apparatus may include a first electrode and a second electrode that generated an electric field, which may be applied to the glass article. Since chemical strengthening of the glass article is performed asymmetrically, the glass article may be chemical strengthened at the same time as being molded into a three-dimensional shape bent toward the first electrode. Accordingly, since a separate thermoforming process, polishing process, or the like may not be needed to implement the three-dimensional shape of the glass article, a manufacturing process of the glass article may be simplified and process costs may be reduced.

In addition, since the molding of a glass article may be performed without physical contact, damage to a surface of the glass article may be reduced or minimized and surface quality may be maintained. In addition, the glass article having various shapes may be implemented by adjusting shapes and arrangements of the first and second electrodes.

Accordingly, efficiency of a manufacturing process using the apparatus for manufacturing a glass article may be improved.

DETAILED DESCRIPTION

Figure 1:
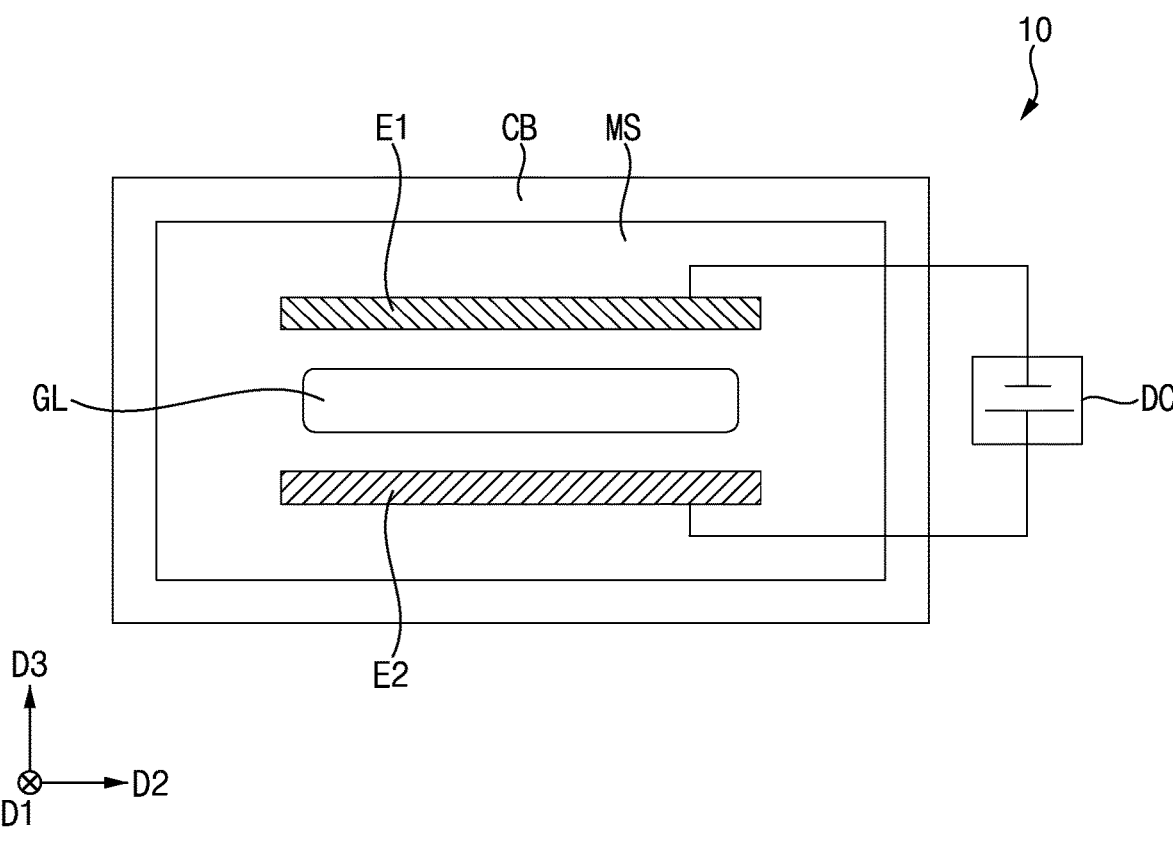
FIG. 1 is a plan view schematically illustrating an apparatus for manufacturing a glass article according to an embodiment of the present disclosure.

Hereinafter, embodiments of the present disclosure will be described in more detail with reference to the accompanying drawings. The same reference numerals are used for the same components in the drawings, and redundant descriptions of the same components may be omitted.

Figure 2:
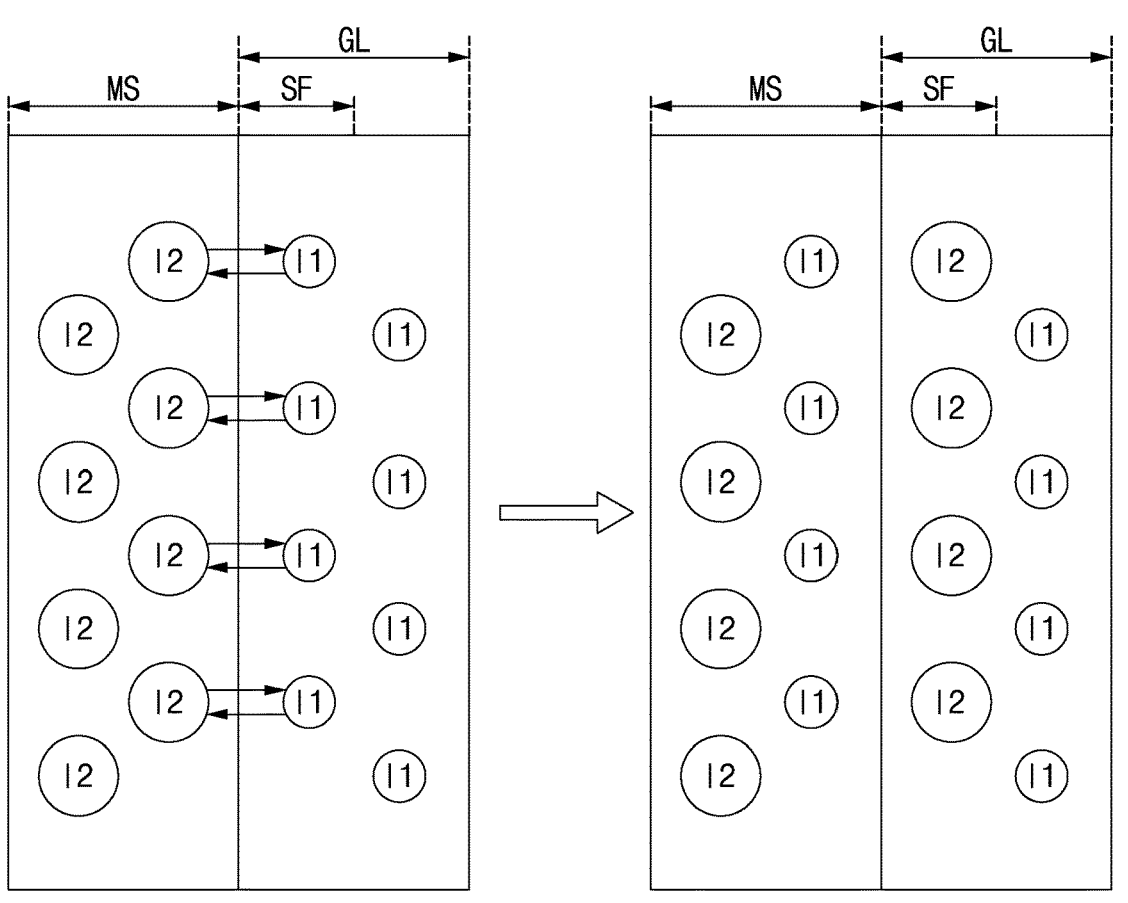
FIG. 2 is a schematic view illustrating an ion exchange process for chemical strengthening.
Figure 3:
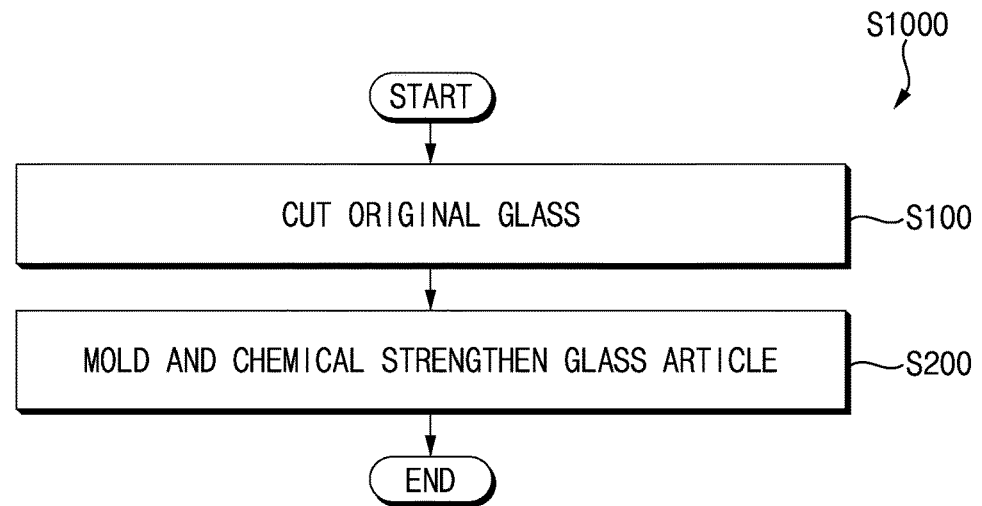
FIG. 3, FIG. 4, FIG. 5, FIG. 6, FIG. 7 and FIG. 8 are views illustrating a method for manufacturing a glass article according to an embodiment of the present disclosure.
Figure 4:
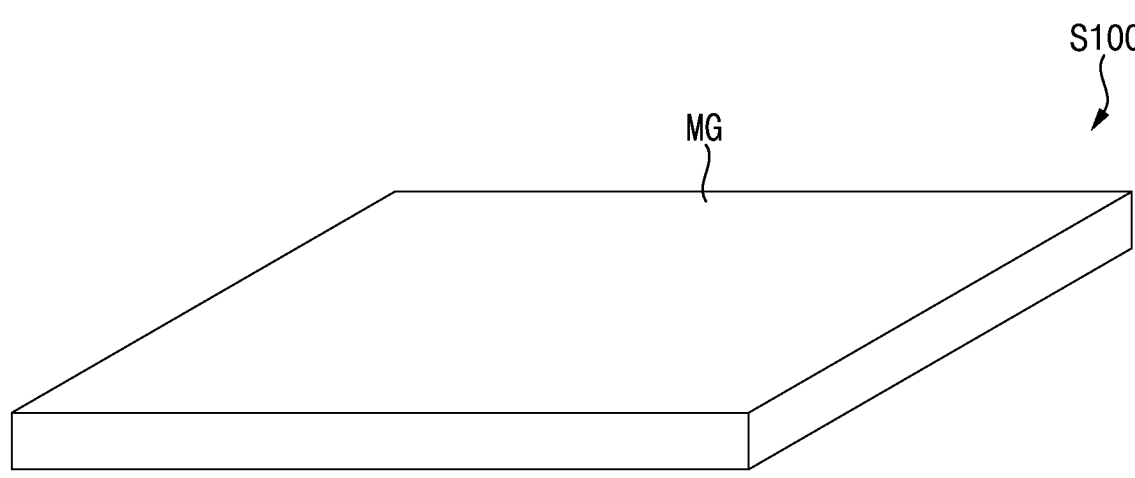
Figure 4:
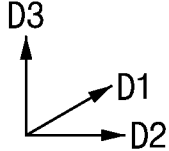
Figure 5:
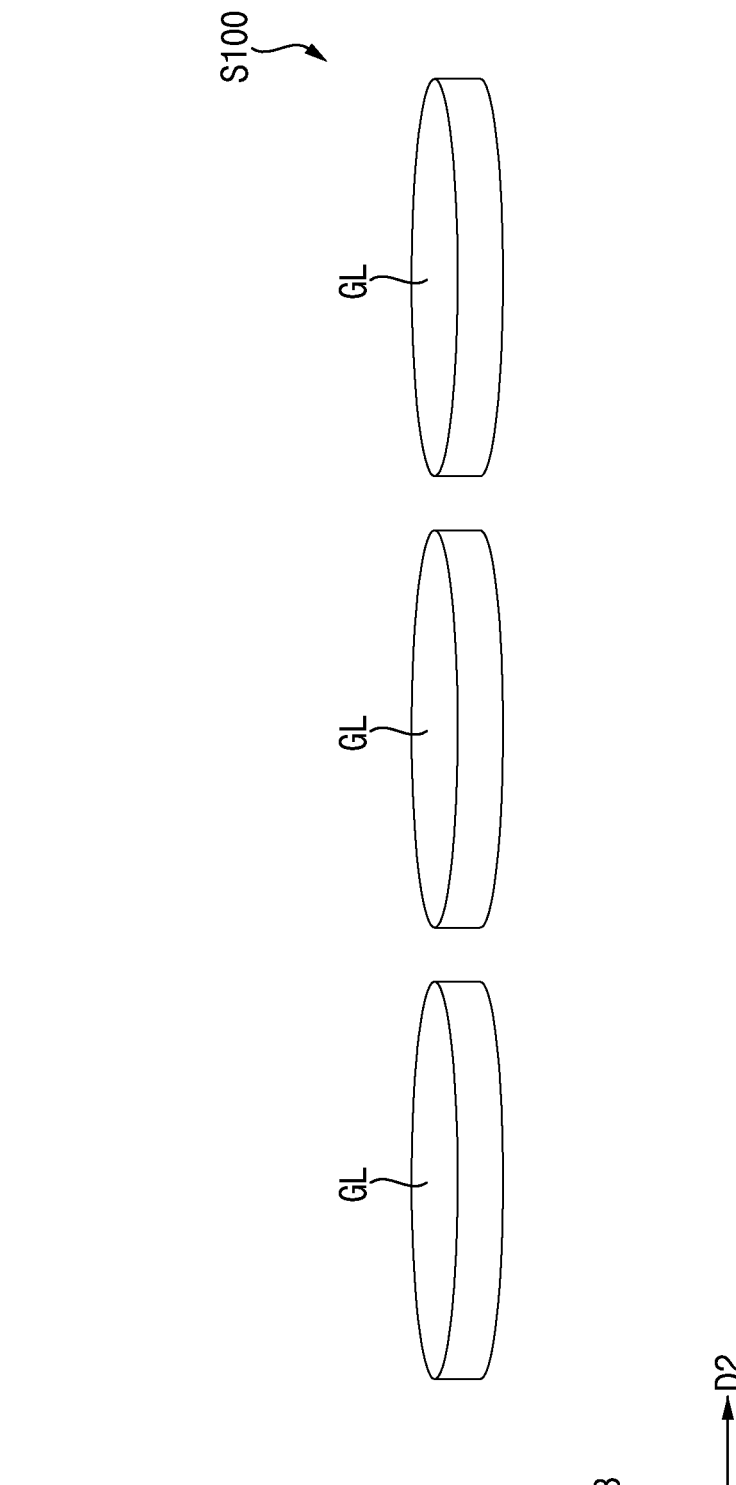

FIG. 1 is a plan view schematically illustrating an apparatus for manufacturing a glass article according to an embodiment of the present disclosure. FIG. 2 is a schematic view illustrating an ion exchange process for chemical strengthening the glass article.

Referring to FIG. 1, an apparatus 10 for manufacturing a glass article according to an embodiment of the present disclosure, the apparatus 10 may include a chamber CB, a first electrode E1, a second electrode E2, and a power supply DC.

The chamber CB may define an inner space. Specifically, the chamber CB may define the inner space in which a glass article may be molded and chemical strengthened. For example, the chamber CB may be a bath.

The chamber CB may accommodate molten salt MS in the inner space. For example, the chamber CB may accommodate a tempering salt bath in the inner space. In an embodiment, the molten salt MS may include at least one of sodium nitrate ($NaNO_3$) or potassium nitrate ($KNO_3$). For example, the molten salt MS may be a single molten salt including $NaNO_3$ or $KNO_3$. Alternatively, the molten salt MS may be a mixed molten salt including $NaNO_3$ and $KNO_3$.

At least an inner surface of the chamber CB may be stable. For example, chamber CB may be formed of a heat-resistant and a chemical-resistant material. For example, the chamber CB may include stainless steel. Accordingly, the molten salt MS may be maintained at a constant temperature within the inner space of the chamber CB. Further, the chamber CB may resist or prevent heat loss of the molten salt MS. In an embodiment, the temperature of the molten salt MS may be maintained at of temperature greater than about 350 degrees Celsius (C).

Each of the first electrode E1 and the second electrode E2 may be disposed in the inner space of the chamber CB. In addition, in a case where the molten salt MS is provided within the inner space of the chamber CB, each of the first electrode E1 and the second electrode E2 may be in overall contact with the molten salt MS. That is, each of the first electrode E1 and the second electrode E2 may be immersed in the molten salt MS within the inner space of the chamber CB.

The first electrode E1 and the second electrode E2 may face each other. For example, the first electrode E1 and the second electrode E2 may be arranged in parallel. The first electrode E1 may be a cathode electrode, and the second electrode E2 may be an anode electrode. Alternatively, the first electrode E1 may be an anode electrode, and the second electrode E2 may be a cathode electrode.

Although FIG. 1 illustrates that the apparatus 10 includes one element forming the first electrode E1 and one element forming the second electrode E2, the present disclosure is not limited thereto. For example, the first electrode E1 may include two or more elements and the second electrode E2 may include two or more elements. The number of elements forming the first element E1 and the second element E2 may be the same or different.

The power supply DC may be disposed outside the chamber CB. The power supply DC may be connected to the first electrode E1 and the second electrode E2. The power supply DC may apply a voltage to the first electrode E1 and the second electrode E2. Accordingly, an electrical current may be carried by electrons in the first electrode E1 and the second electrode E2 and an electric field may be generated between the first electrode E1 and the second electrode E2. The power supply DC may pump electrons away from the anode and into the cathode. The positive anode may attract anions toward it, while the negative cathode may attract cations toward it. For example, the electric field may have a direction from the anode electrode, for example, the second electrode E2, to the cathode electrode, for example, the first electrode E1.

The glass article GL disposed within the inner space of the chamber CB may be immersed in the molten salt MS. Specifically, the glass article GL may be disposed between the first electrode E1 and the second electrode E2 in the inner space of the chamber CB.

The glass article GL may be chemical strengthened while being immersed in the molten salt MS. The chemical strengthening of the glass article GL may be performed through an ion exchange process. That is, ions inside the glass article GL and ions outside the glass article GL may be exchanged. In other words, ions included in the glass article GL and ions included in the molten salt MS may be exchanged, so that the glass article GL may be chemical strengthened. Accordingly, the strength of the glass article GL may be improved. For example, the glass article may have strength not to be easily damaged by external impact.

The glass article GL may include first ions I1. For example, the first ions I1 may include at least one of lithium $(Li^+)$ or sodium $(Na^+)$. In addition, the molten salt MS may include second ions I2. The second ions I2 may have a same valence or oxidation state as the first ions I1. For example, the second ions I2 may include at least one of $Na^+$ or $K^+$.

The first ions I1 located in a surface SF of the glass article GL may be exchanged with the second ions I2 of the molten salt MS. The second ions I2 may have an ionic radius greater than an ionic radius of the first ions I1. For example, $Li^+$ located in the surface SF of the glass article GL may be exchanged with $Na^+$ included in the molten salt MS. In addition, $Na^+$ located in the surface SF of the glass article GL may be exchanged with $K^+$ included in the molten salt MS.

Since the second ions I2 exchanged with the first ions I1 may have the greater ionic radius than the first ions I1, compressive stress may occur in the surface SF of the glass article GL. As the amount of the second ions I2 exchanged with the first ions I1 increases, the compressive stress may increase.

Since the exchange of the first ions I1 and the second ions I2 may be performed through the surface SF and a vicinity of the surface SF of the glass article GL, a concentration of the second ions I2 may be relatively high at the surface SF of the glass article GL. Some of the exchanged second ions I2 may be diffused into the glass article GL and increase a compression stress at a depth within the glass article GL. The concentration of the second ions I2 in the glass article GL may generally decrease as a distance from the surface SF increases. Accordingly, the compressive stress may be greatest at the surface SF of the glass article GL, and may decrease with a depth within the glass article GL. However, the present disclosure is not limited thereto, and the compressive stress within the glass article GL may be affected by process parameters of the ion exchange process, including for example, temperature, time, frequency, presence or absence of heat treatment, or the like.

FIG. 3, FIG. 4, FIG. 5, FIG. 6, FIG. 7 and FIG. 8 are views illustrating a method of manufacturing a glass article according to an embodiment of the present disclosure.

A method (S1000) for manufacturing a glass article described with reference to FIG. 3, FIG. 4, FIG. 5, FIG. 6, FIG. 7 and FIG. 8 may be performed using the apparatus 10 described with reference to FIG. 1 and FIG. 2. Therefore, redundant descriptions may be omitted or simplified.

Referring to FIG. 1, FIG. 3, FIG. 4 and FIG. 5, in the method (S1000) for manufacturing a glass article using the apparatus 10, an original glass MG may be cut (S100).

In the cutting the original glass MG (S100), a plurality of glass articles GL may be formed. For example, the original glass MG may be processed into a shape of the glass article GL through a computer numerical control (CNC) device.

In an embodiment, the glass article GL may have a circular planar shape. However, the present disclosure is not limited thereto, and the glass article GL may have various shapes such as a rectangular planar shape, a polygonal planar shape with rounded corners, an elliptical planar shape, or the like.

Referring to FIG. 1, FIG. 2, FIG. 3, FIG. 6, FIG. 7 and FIG. 8, in the method (S1000) for manufacturing a glass article using the apparatus 10, the glass article GL may be molded and chemical strengthened (S200).

In the molding and chemical strengthening the glass article GL (S200), the glass article GL may be simultaneously molded and chemical strengthened.

Since the glass article GL may be chemical strengthened, the glass article GL may include a chemical strengthened area SA and a non-chemical strengthened area NSA. The chemical strengthened area SA may be formed along the surface SF of the glass article GL, and the non-chemical strengthened area NSA may be formed inside the glass article GL. For example, the chemical strengthened area SA may entirely surround the non-chemical strengthened area NSA. For example, the chemical strengthened area SA may cover a top surface, a bottom surface, and a sidewall(s) of the non-chemical strengthened area NSA.

Figure 6:
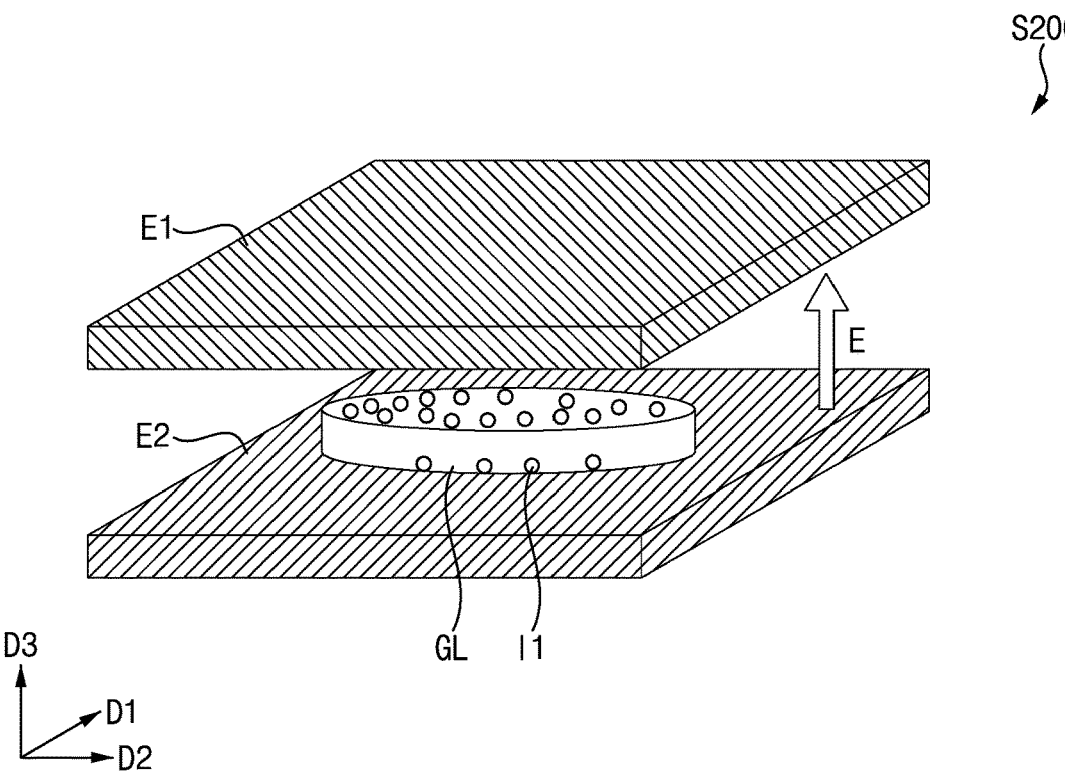

In an embodiment, an electric field E may be applied to the glass article GL (see FIG. 6). For example, a negative voltage may be applied to the first electrode E1, and a positive voltage may be applied to the second electrode E2. The first electrode E1 may apply the negative voltage to a first surface SF1 of the glass article GL adjacent to the first electrode E1, and the second electrode E2 may apply the positive voltage to a second surface SF2 of the glass article GL adjacent to the second electrode E2. For example, the first surface SF1 and the second surface SF2 may be opposite surfaces of the glass article GL. Accordingly, the electric field E may be generated between the first electrode E1 and the second electrode E2, and the electric field E may be applied to the glass article GL. In an embodiment, a size of each of the first electrode E1 and the second electrode E2 may be greater than or equal to a size of the glass article GL. For example, a planar area of each of the first electrode E1 and the second electrode E2 along the first direction D1 and the second direction D2 may be greater than or equal to a planar area of the glass article GL.

In an embodiment, an intensity of the electric field E may be in a range of about 100 volts per centimeter (V/cm) to about 1500V/cm, but the present disclosure is not limited thereto.

The first ions I1 included in the glass article GL may have the same polarity as the second electrode E2. The first ions I1 included in the glass article GL may have a different polarity from the first electrode E1. For example, each of the first ions I1 and the second electrode E2 may have a positive polarity, and the first electrode E1 may have a negative polarity. Interactions between ionic charges of the first ions I1 and the second ions I2 and the electric field between the first electrode E1 and the second electrode E2 may result in a migration of at least one of the first ions I1 or the second ions I2. For example, the first ions I1 adjacent to the first electrode E1 may remain adjacent to the first electrode E1, and the first ions I1 adjacent to the second electrode E2 may move toward the first electrode E1. That is, as some of the first ions I1 may move toward the first electrode E1, the first ions I1 may be concentrated on the first surface SF1 of the glass article GL adjacent to the first electrode E1 (see FIG. 7).

In an embodiment, a relatively concentrated area of the first ions I1 may be formed so that the chemical strengthening of the glass article GL may be performed asymmetrically. Specifically, ion exchange between the first ions I1 and the second ions I2 may be relatively more active on the first surface SF1 where the first ions I1 are more concentrated than on the second surface SF2. In addition, a chemical strengthened thickness TH1 of the first surface SF1 in which the first ions I1 are relatively more concentrated may be greater than a chemical strengthened thickness TH2 of the second surface SF2 (see FIG. 7). In other words, the compressive stress may be greater in the first surface SF1 adjacent to the first electrode E1 than in the second surface SF2 adjacent to the second electrode E2. In an embodiment, the glass article GL may be bent toward the first electrode E1. The glass article GL may be bent toward the first electrode E1 by the asymmetrical chemical strengthening of the glass article GL. Specifically, the glass article GL may be molded to have a dome shape bent toward the first electrode E1 (see FIG. 8). That is, the glass article GL may be chemical strengthened at the same time as being molded to have a three-dimensional shape. For example, the glass article GL in the chamber CB may have a three-dimensional shape including a portion bent toward the cathode electrode, for example, the first electrode E1. For example, the three-dimensional shape may include an edge portion of the glass article GL bent upward, away from a central portion of the glass article GL, and the glass article GL may have a dish shape with a concave side and a convex side. The glass article GL having the three-dimensional shape may be removed from the chamber CB.

Figure 7:
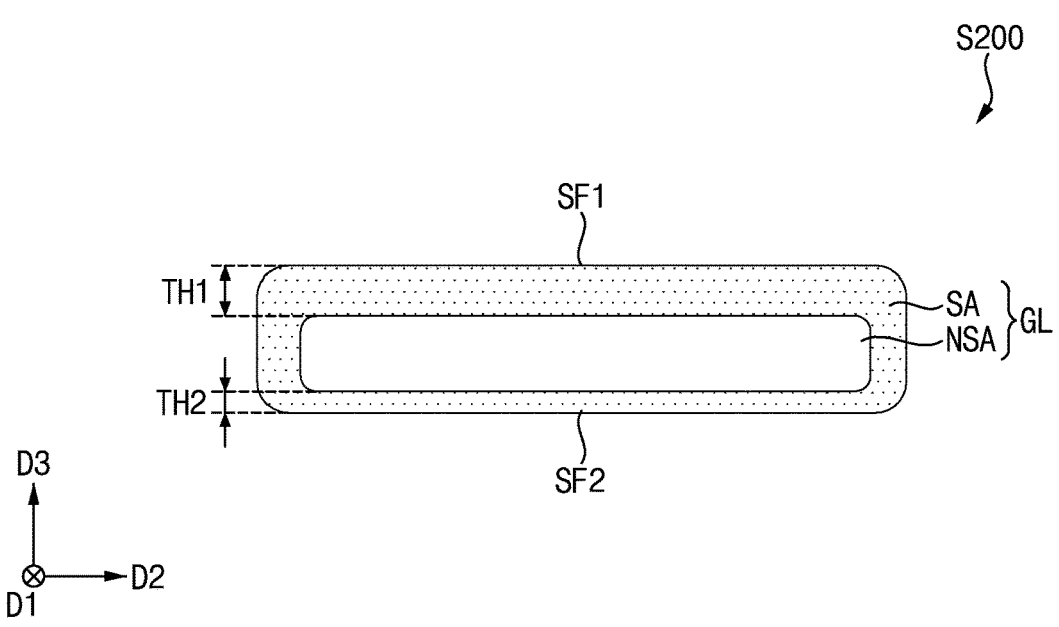
Figure 8:
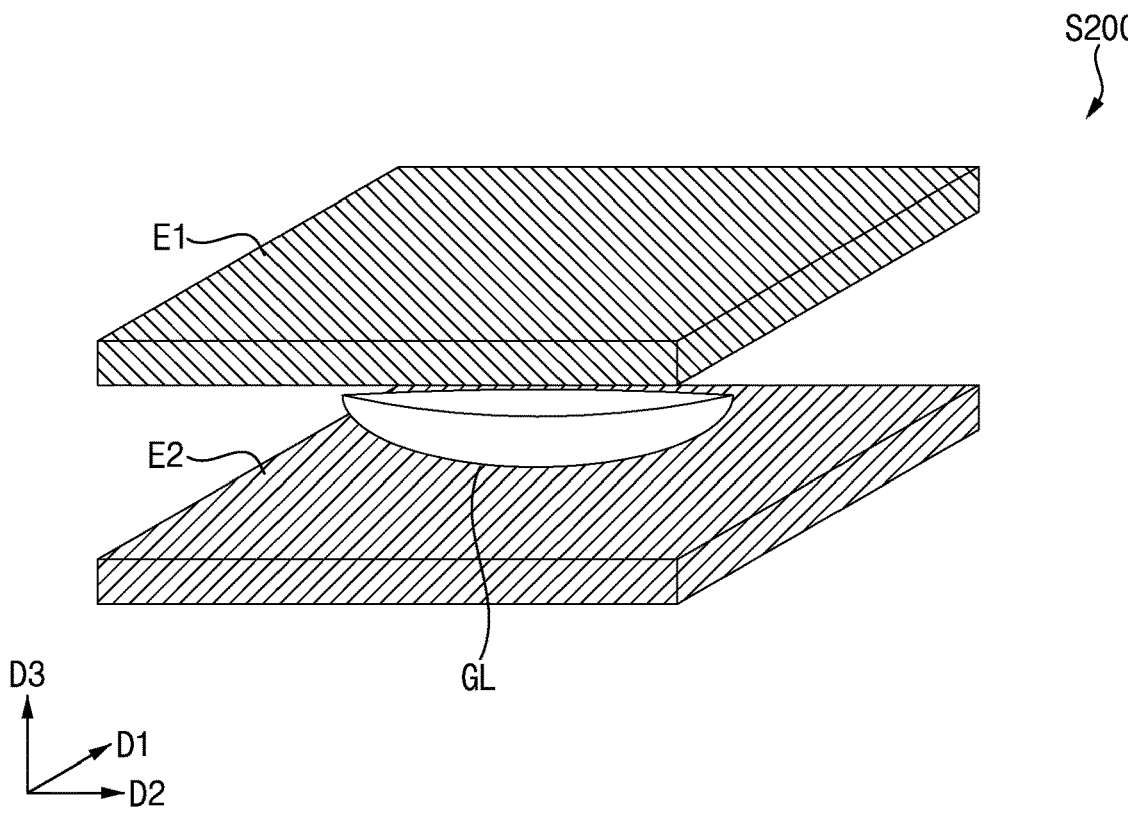

Although FIG., 6, FIG. 7 and FIG. 8 illustrate that the first electrode E1 and the second electrode E2 each have a rectangular planar shape, the present disclosure is not limited thereto. Alternatively, each of the first electrode E1 and the second electrode E2 may have various shapes such as a polygonal planar shape, a circular planar shape, or the like.

In addition, although FIG. 8 illustrates that the glass article GL may have the dome shape, the present disclosure is not limited thereto. The glass article GL may be molded to have various shapes, such as a shape with a curved edge, a folded shape, or the like.

The apparatus 10 for manufacturing a glass article according to an embodiment of the present disclosure may include the first electrode E1 and the second electrode E2. The first electrode E1 and the second electrode E2 may apply the electric field E to the glass article GL. Since the chemical strengthening of the glass article GL may be performed asymmetrically, the glass article GL may be chemical strengthened at the same time that the glass article GL is being molded into the three-dimensional shape including a portion bent toward the cathode electrode, for example, the first electrode E1. Accordingly, since a separate thermoforming process, polishing process, or the like may not be needed to implement the three-dimensional shape of the glass article GL, a manufacturing process of the glass article GL may be simplified and process costs may be reduced.

In addition, the glass article GL may be molded without physical contact, and damage to the surface of the glass article GL may be reduced or minimized and surface quality may be maintained. For example, the glass article GL may be molded without being placed in physical contact with a mold or rollers, and damage to the surface of the glass article GL may be reduced or minimized and surface quality may be maintained. In addition, the glass article GL having various shapes may be implemented by adjusting shapes, arrangements, or the like of the first electrode E1 and the second electrode E2. Accordingly, efficiency of a manufacturing process using the apparatus 10 for manufacturing a glass article may be improved.

Figure 9:
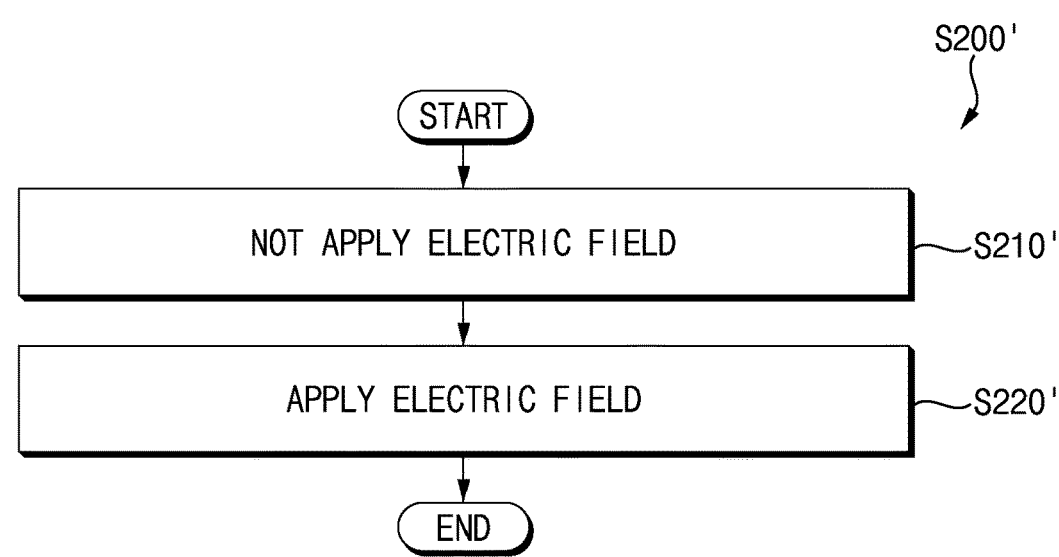
FIG. 9, FIG. 10 and FIG. 11 are views illustrating another example of molding and chemical strengthening a glass article.
Figure 10:
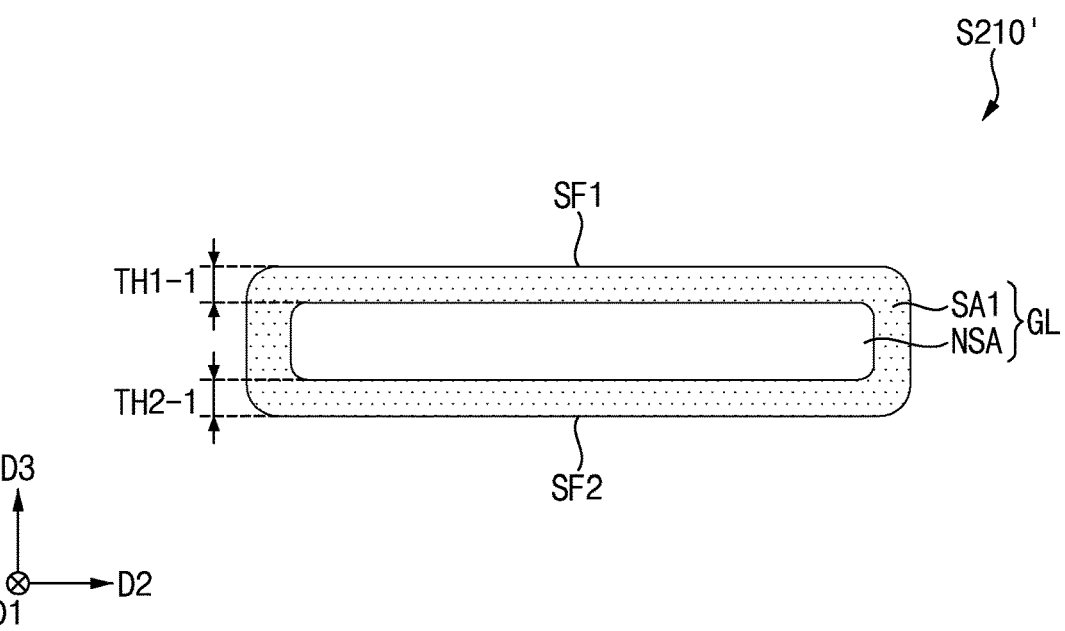
Figure 11:
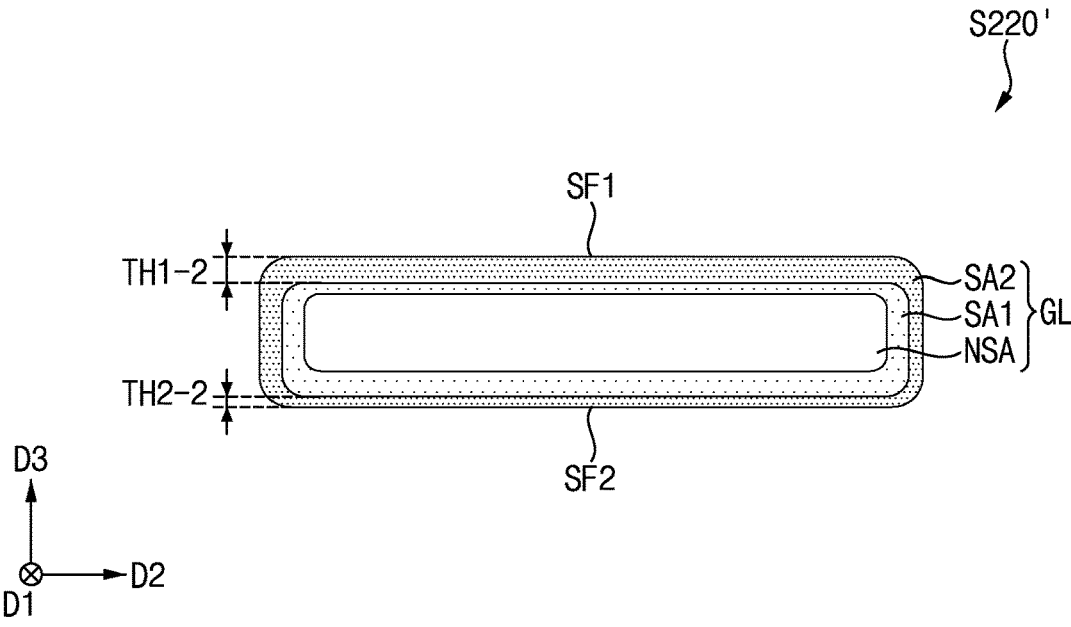

FIG. 9, FIG. 10 and FIG. 11 are views illustrating another example method in which a glass article may be molded and chemically strengthened.

Redundant descriptions of the molding and chemical strengthening of the glass article (S200), for example, as described with reference to FIG. 6, FIG. 7 and FIG. 8 may be omitted or simplified.

Referring to FIG. 1, FIG. 3, FIG. 9, FIG. 10 and FIG. 11, in the method (S1000) for manufacturing a glass article using the apparatus 10, the glass article GL may be molded and chemical strengthened (S200').

The molding and chemical strengthening the glass article GL (S200') may include a step of not applying an electric field at a first time (S210') and a step of applying an electric field at a second time (S220'). The step of not applying the electric field (S210') and the step of applying the electric field (S220') may be sequentially performed, wherein the second time follows the first time.

In the step of not applying the electric field (S210'), the electric field E may not be applied to the glass article GL, and the glass article GL may be subjected to a first chemical strengthening. The first chemical strengthening may be a separate chemical strengthening, not corresponding to a molding process. Following the first chemical strengthening, the glass article GL may include a first chemical strengthened area SA1 and a non-chemical strengthened area NSA.

In an embodiment, since the electric field E may not be applied to the glass article GL during the first chemical strengthening, the first chemical strengthening of the glass article GL may be performed symmetrically. More specifically, the first ions I1 may be uniformly distributed in the glass article GL, and a first thickness TH1-1 of the first surface SF1 subjected to the first chemical strengthening may be the same as a second thickness TH2-1 of the second surface SF2 subjected to the first chemical strengthening (see FIG. 10). Further, the compressive stress within the glass article GL may be the same in the first surface SF1 and the second surface SF2. Accordingly, the first chemical strengthening of the glass article GL may be performed without bending the glass article GL toward the first electrode E1 or the second electrode E2.

In the step of applying the electric field (S220'), the electric field E may be applied to the glass article GL, and the glass article GL may be subjected to a second chemical strengthening. In the case where the second chemical strengthening may be performed while the electric field E may be applied to the glass article GL, the second chemical strengthening and a molding of the glass article GL may be performed simultaneously.

Following the second chemical strengthening, the glass article GL may include a second chemical strengthened area SA2, the first chemical strengthened area SA1 and the non-chemical strengthened area NSA. The second chemical strengthened area SA2 may entirely surround the first chemical strengthened area SA1. Specifically, a portion of the first chemical strengthened area SA1 adjacent to an edge of the glass article GL in the first chemical strengthened area SA1 may be subjected to the second chemical strengthening. Accordingly, the second chemical strengthened area SA2, which may have a strength greater than a strength of the first chemical strengthened area SA1, may be formed to surround the first chemical strengthened area SA1.

In an embodiment, since the electric field E may be applied to the glass article GL during the second chemical strengthening, the second chemical strengthening of the glass article GL may be performed asymmetrically. For example, the electric field E may produce an asymmetrical effect on the chemical strengthening of the glass article GL, wherein an asymmetry of ions diffused into surfaces of the glass article GL from the molten salt during the chemical strengthening simultaneously molds the glass article to have a three-dimensional shape. More specifically, the first ions I1 may be concentrated on the first surface SF1, and a first thickness TH1-2 of the first surface SF1 subjected to the second chemical strengthening may be greater than a second thickness TH2-2 of the second surface SF2 subjected to the second chemical strengthening (see FIG. 11). In other words, the compressive stress may be greater in the first surface SF1 than in the second surface SF2. Accordingly, the glass article GL may be chemical strengthened while simultaneously being molded to have a three-dimensional shape. For example, the glass article GL in the chamber CB may have a three-dimensional shape including a portion bent toward the cathode electrode, for example, the first electrode E1.

In an embodiment, since the molding and chemical strengthening the glass article GL (S200') may include the step of not applying the electric field (S210') and the step of applying the electric field (S220'), which are sequentially performed, the glass article GL may have the three-dimensional shape with a relatively small curvature. For example, the glass article GL in the chamber CB may have the three-dimensional shape bent toward the cathode electrode with a relatively small curvature.

Although FIG. 9, FIG. 10 and FIG. 11 illustrate that two strengthening steps (S210' and S220') may be performed in the molding and chemical strengthening of the glass article GL (S200'), the present disclosure is not limited thereto. For example, three or more strengthening steps may be performed in the molding and chemical strengthening of the glass article GL (S200').

Figure 12:
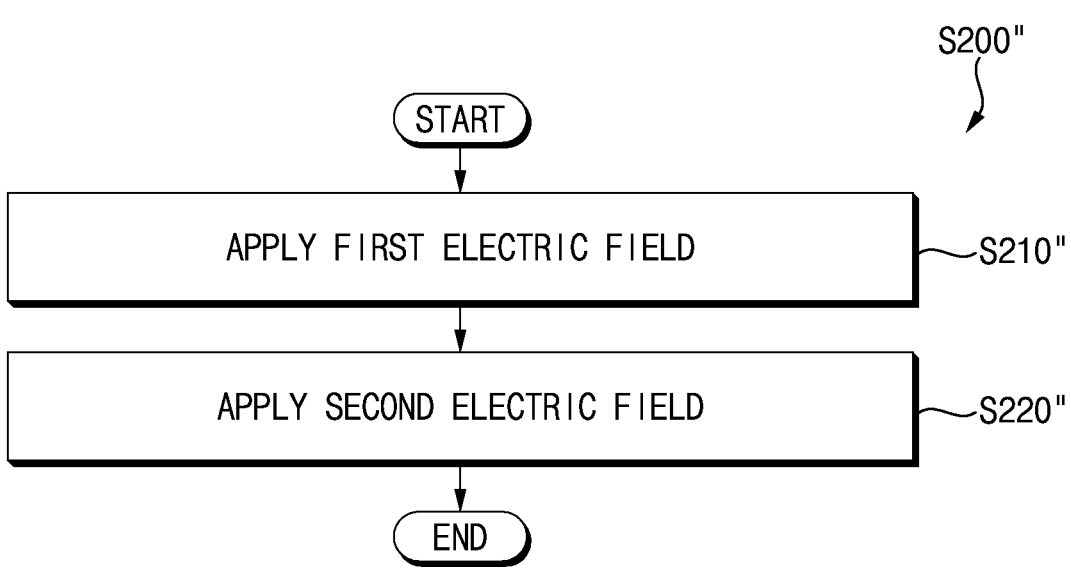
FIG. 12, FIG. 13 and FIG. 14 are views illustrating still another example of molding and chemical strengthening a glass article.
Figure 13:
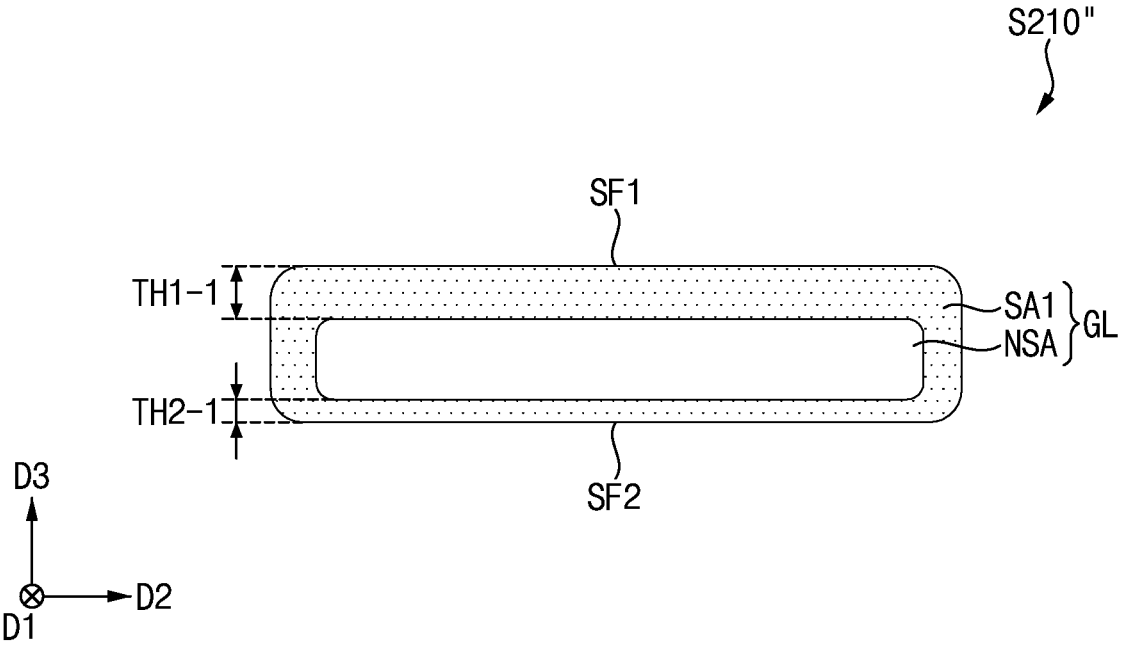
Figure 14:
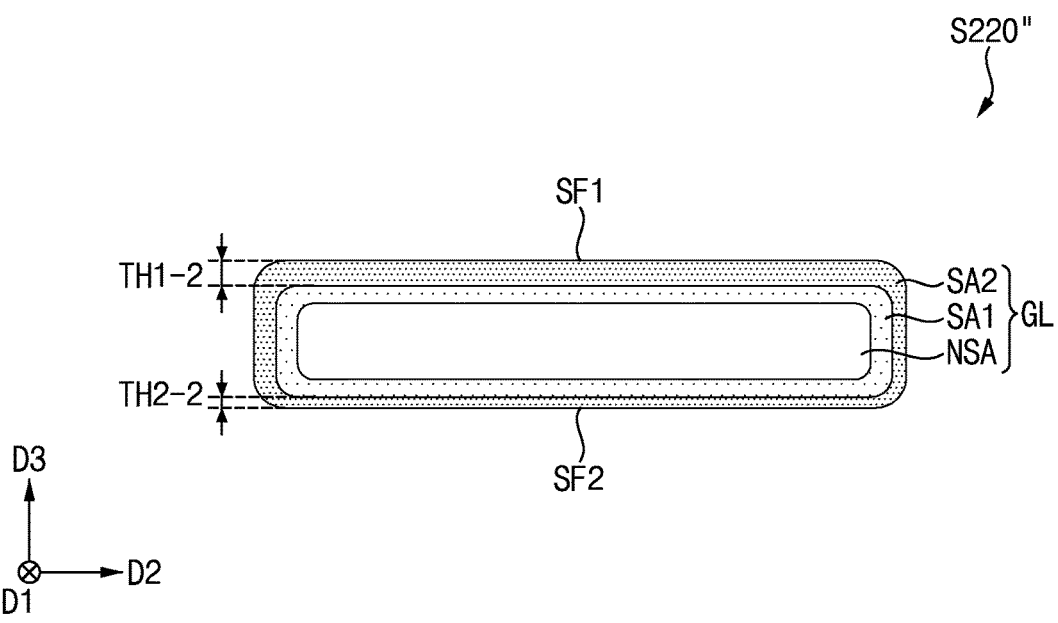

FIG. 12, FIG. 13 and FIG. 14 are views illustrating still another example method in which a glass article may be molded and chemical strengthened.

Redundant descriptions of the molding and chemical strengthening of the glass article (S200') described with reference to FIG. 9, FIG. 10 and FIG. 11 may be omitted or simplified.

Referring to FIG. 1, FIG. 3, FIG. 12, FIG. 13 and FIG. 14, in the method (S1000) for manufacturing a glass article using the apparatus 10, the glass article GL may be molded and chemical strengthened (S200").

The molding and chemical strengthening the glass article GL (S200") may include a step of applying a first electric field (S210") and a step of applying a second electric field (S220"). The step of applying the first electric field (S210") and the step of applying the second electric field (S220") may be sequentially performed.

In the step of applying the first electric field (S210"), the electric field E may be applied to the glass article GL, and the glass article GL may be subjected to a first chemical strengthening at the same time as being molded. An intensity of the electric field E in the step of applying the first electric field (S210") may be constant. Following the application of the first electric field (S210"), the glass article GL may include a first chemical strengthened area SA1 and a non-chemical strengthened area NSA.

In an embodiment, the electric field E may be applied to the glass article GL, and the first chemical strengthening of the glass article GL may be performed asymmetrically. More specifically, the first ions I1 may be relatively concentrated on the first surface SF1, and a first thickness TH1-1 of the first surface SF1 subjected to the first chemical strengthening may be greater than a second thickness TH2-1 of the second surface SF2 subjected to the first chemical strengthening (see FIG. 13). Further, the compressive stress within the glass article GL may be greater in the first surface SF1 than in the second surface SF2. Accordingly, the glass article GL may be chemical strengthened at the same time as being molded to have a three-dimensional shape. For example, the glass article GL in the chamber CB may have a three-dimensional shape including a portion bent toward a cathode electrode, for example, the first electrode E1.

In the step of applying the second electric field (S220"), the electric field E may be applied to the glass article GL, and the glass article GL may be subjected to a second chemical strengthening at the same time as being molded.

In an embodiment, an intensity of the electric field E in the step of applying the second electric field (S220") may be different than an intensity of the electric field E in the step of applying the first electric field (S210"). For example, the intensity of the electric field E in the step of applying the second electric field (S220") may be greater than the intensity of the electric field E in the step of applying the first electric field (S210"). The intensity of the electric field E in the step of applying the second electric field (S220") may be constant.

Following the second chemical strengthening, the glass article GL may include a second chemical strengthened area SA2, the first chemical strengthened area SA1 and the non-chemical strengthened area NSA. The second chemical strengthened area SA2 may entirely surround the first chemical strengthened area SA1.

In an embodiment, the electric field E may be applied to the glass article GL, and the second chemical strengthening of the glass article GL may be performed asymmetrically. More specifically, the first ions I1 may be relatively concentrated on the first surface SF1, and a first thickness TH1-2 of the first surface SF1 subjected to the second chemical strengthening may be greater than a second thickness TH2-2 of the second surface SF2 subjected to the second chemical strengthening (see FIG. 14). In other words, the compressive stress within the glass article GL may be greater in the first surface SF1 than in the second surface SF2. Accordingly, the glass article GL may be chemical strengthened at the same time as being molded to have a three-dimensional shape. For example, the glass article GL in the chamber CB may have a three-dimensional shape including a portion bent toward the cathode electrode, for example, the first electrode E1.

In an embodiment, since the molding and chemical strengthening of the glass article GL (S200") may include the step of applying the first electric field (S210") and the step of applying the second electric field (S220"), which are sequentially performed, the glass article GL may have a three-dimensional shape with a relatively large curvature. For example, the glass article GL in the chamber CB may have a three-dimensional shape with a relatively large curvature including a portion bent toward the cathode electrode, for example, the first electrode E1. For example, when the intensity of the electric field E in the step of applying the second electric field (S220″) is greater than the intensity of the electric field E in the step of applying the first electric field (S210″), the compressive stress of the first surface SF1 may be greater than the compressive stress of the second surface SF2, and the glass article GL may be bent towards the cathode electrode with the relatively large curvature.

Although FIG. 12, FIG. 13 and FIG. 14 illustrate a method that may include a step of applying a first electric field (S210″) and a step of applying a second electric field (S220″) that may be performed in the molding and chemical strengthening the glass article GL (S200″), the present disclosure is not limited thereto. For example, three or more steps of applying an electric field may be performed in the molding and chemical strengthening the glass article GL (S200″).

Figure 15:
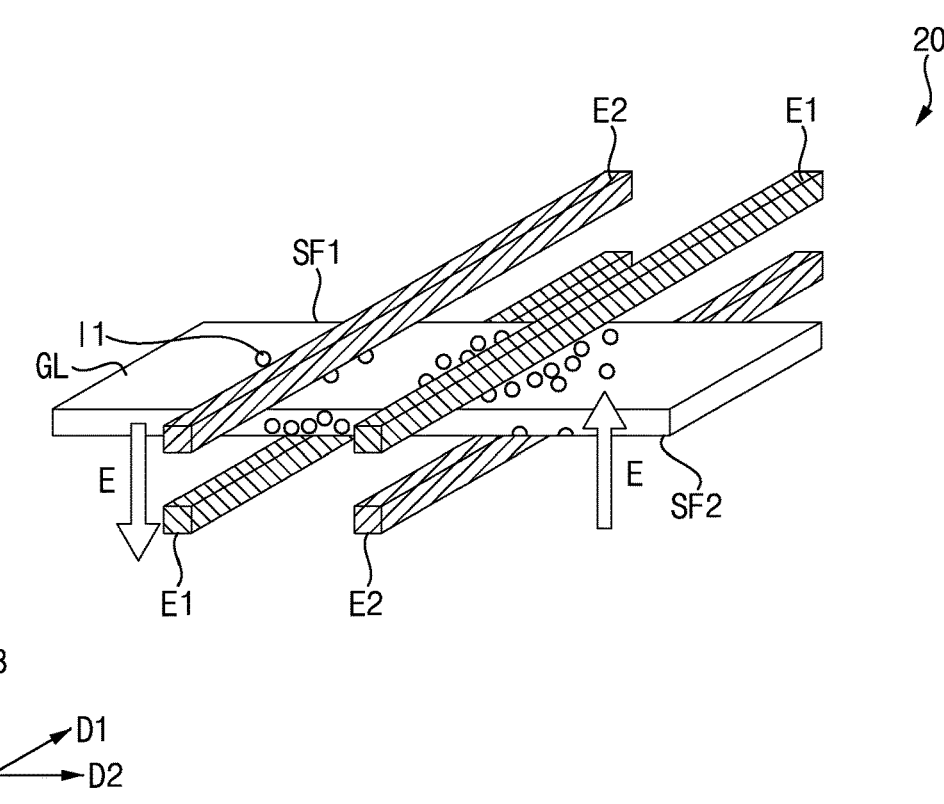
FIG. 15 and FIG. 16 are views schematically illustrating an apparatus for manufacturing a glass article according to another embodiment of the present disclosure.
Figure 16:
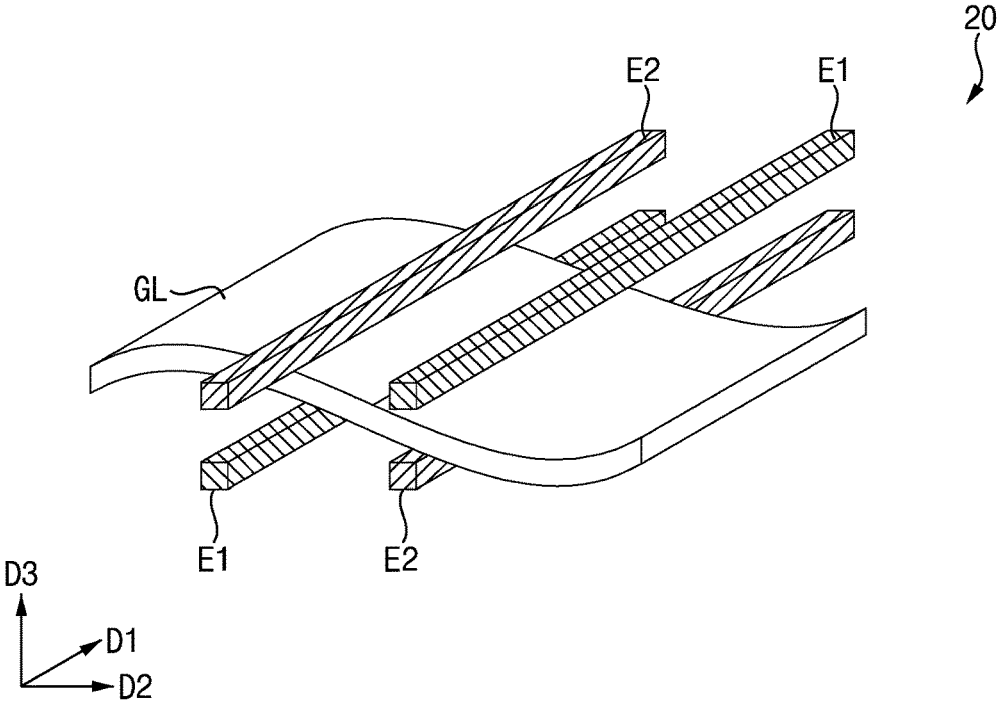

FIG. 15 and FIG. 16 are views schematically illustrating an apparatus for manufacturing a glass article according to another embodiment of the present disclosure.

An apparatus 20 for manufacturing a glass article described with reference to FIG. 15 and FIG. 16 may be substantially the same as the apparatus 10 described with reference to FIGS. 1 to 14 except for a shape and arrangement of each of the first electrode E1 and the second electrode E2. Redundant descriptions thereof may be omitted or simplified.

Referring to FIG. 15 and FIG. 16, the apparatus 20 for manufacturing a glass article may include a plurality of first electrodes E1 and a plurality of second electrodes E2. FIG. 15 and FIG. 16 illustrate two of the first electrodes E1 and two of the second electrodes E2. However, the number of electrodes is not limited thereto. For example, one or more of the first electrodes E1 and one or more of the second electrodes E2 may be provided.

In an embodiment, the first electrodes E1 and the second electrodes E2 may each extend in a first direction D1. In addition, the first electrodes E1 and the second electrodes E2 may be alternately arranged along a second direction D2 intersecting the first direction D1. For example, the second direction D2 may be perpendicular to the first direction D1.

The first electrodes E1 and the second electrodes E2 may be alternately arranged. For example, a first electrode E1 and a second electrode E2 may face each other with the glass article GL parallel to a plane defined by the first direction D1 and the second direction D2 and interposed between the first electrode E1 and the second electrode E2 in a third direction D3, perpendicular to the plane defined by the first direction D1 and the second direction D2. In other words, the second electrodes E2 and the first electrodes E1 may be alternately arranged along the second direction D2 on the first surface SF1 of the glass article GL, and the first electrodes E1 and the second electrodes E2 may be alternately arranged along the second direction D2 on the second surface SF2 of the glass article GL.

In an embodiment, the electric field E may be applied to the glass article GL. For example, a negative voltage may be applied to each of the first electrodes E1, and a positive voltage may be applied to each of the second electrodes E2, and the voltages applied to the first electrodes E1 and the second electrodes E2 may generated the electric field E that may be applied to the glass article GL. For example, the electric field E may be generated between the first electrode E1 and the second electrode E2 facing each other with the glass article GL interposed therebetween.

For example, the electric field E may be applied with a first direction from the second electrode E2 adjacent to the first surface SF1 to the first electrode E1 adjacent to the second surface SF2, and the electric field E may be applied with a second direction from the second electrode E2 adjacent to the second surface SF2 to the first electrode E1 adjacent to the first surface SF1.

In an embodiment, concentrated areas of the first ion I1 may be formed so that the chemical strengthening of the glass article GL may be performed asymmetrically. Specifically, the first ions I1 may be concentrated in a portion of the first surface SF1 and in a portion of the second surface SF2 of the glass article GL adjacent to each of the first electrodes E1.

Accordingly, the glass article GL may be bent toward each of the first electrodes E1 (see FIG. 16). Specifically, the glass article GL may be bent to have an S shape with portions bent toward each of the first electrodes E1. That is, the glass article GL may be chemical strengthened at the same time as being molded to have a three-dimensional shape. For example, portions of the glass article GL may be bent toward each of the cathode electrodes, for example, the first electrodes E1.

Figure 17:
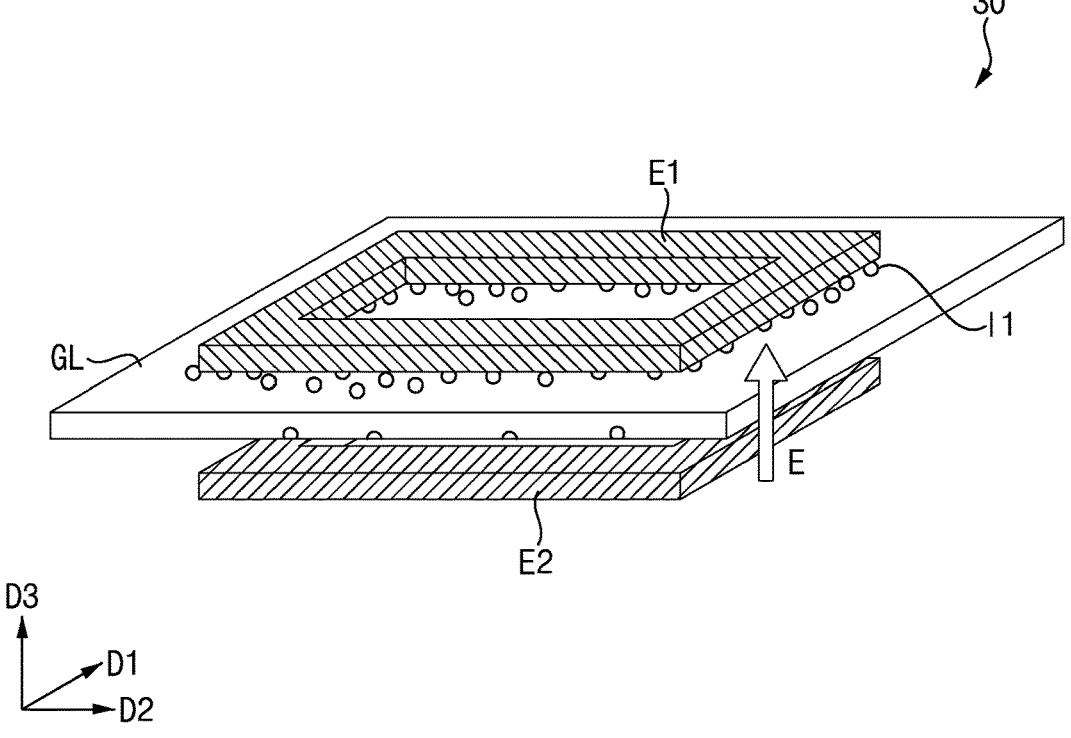
FIG. 17 and FIG. 18 are views schematically illustrating an apparatus for manufacturing a glass article according to still another embodiment of the present disclosure.
Figure 18:
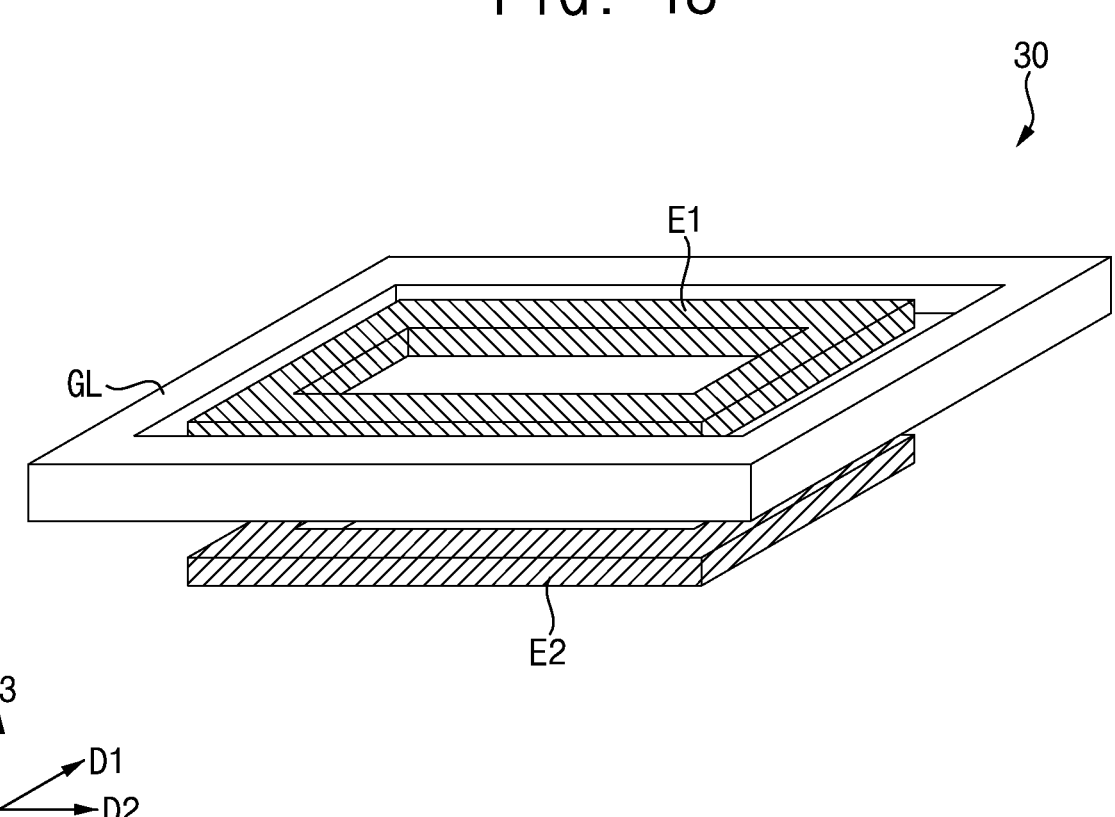

FIG. 17 and FIG. 18 are views schematically illustrating an apparatus for manufacturing a glass article according to still another embodiment of the present disclosure.

An apparatus 30 for manufacturing a glass article described with reference to FIG. 17 and FIG. 18 may be substantially the same as the apparatus 10 described with reference to FIGS. 1 to 14 except for a shape of each of the first electrode E1 and the second electrode E2. Redundant descriptions thereof may be omitted or simplified.

Referring to FIG. 17 and FIG. 18, the apparatus 30 for manufacturing a glass article may include the first electrode E1 and the second electrode E2.

In an embodiment, the first electrode E1 may have a hollow rectangular planar shape and the second electrode E2 may have a hollow rectangular planar shape. In addition, a size of each of the first electrode E1 and the second electrode E2 may be smaller than a size of the glass article GL. For example, a planar area of each of the first electrode E1 and the second electrode E2 along the first direction D1 and the second direction D2 may be less than a planar area of the glass article GL.

In an embodiment, the electric field E may be applied to the glass article GL, and chemical strengthening of the glass article GL may be performed asymmetrically.

Accordingly, the glass article GL may be bent toward the first electrode E1 (see FIG. 18). Specifically, an edge portion of the glass article GL may be bent. For example, the edge portion of the glass article GL may be bent to surround the first electrode E1. The glass article GL may be molded to have a box shape that accommodates the first electrode E1. That is, the glass article GL may be chemical strengthened at the same time as being molded to have a three-dimensional shape. For example, the glass article GL may include a portion bent toward the cathode electrode, for example, the first electrode E1.

The present disclosure can be applied to a manufacturing process of various display devices. For example, the present disclosure may be applicable to a manufacturing process of various display devices such as display devices for vehicles, ships and aircraft, portable communication devices, display devices for exhibition or information transmission, medical display devices, and the like.

The foregoing is illustrative of embodiments and is not to be construed as limiting thereof. Although embodiments have been described, those skilled in the art will readily appreciate that many modifications are possible without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A method for manufacturing a glass article, the method comprising:

immersing the glass article having a first surface, a second surface, and a sidewall connecting the first surface and the second surface in a molten salt disposed in an inner space of a chamber, wherein the first surface, the second surface, and the sidewall contact the molten salt, wherein the molten salt is provided as a single volume; and molding and chemical strengthening the first surface, the second surface, and the sidewall of the glass article at a same time by applying an electric field to the glass article.

2. The method of claim 1, wherein a first electrode in contact with the molten salt is disposed in the inner space of the chamber, a second electrode in contact with the molten salt and facing the first electrode is disposed in the inner space of the chamber, and in the immersing the glass article, at least a portion of the glass article is disposed between the first electrode and the second electrode.

3. The method of claim 2, wherein in the molding and chemical strengthening the glass article at the same time, a chemical strengthened thickness of the first surface of the glass article facing the first electrode is greater than a chemical strengthened thickness of the second surface of the glass article facing the second electrode, and the glass article is bent toward the first electrode.

4. The method of claim 2, wherein the molding and chemical strengthening the glass article at the same time further comprises:

applying, by the first electrode, a negative voltage to the glass article;

applying, by the second electrode, a positive voltage to the glass article; and concentrating first ions included in the glass article in at least a portion of the first surface of the glass article adjacent to the first electrode.

5. The method of claim 4, wherein the first ions include at least one of lithium ($Li^+$) and sodium ($Na^+$).

6. The method of claim 4, wherein the molding and chemical strengthening the glass article at the same time further comprises:

exchanging the first ions located in the first surface of the glass article with second ions included in the molten salt and having an ionic radius greater than an ionic radius of the first ions.

7. The method of claim 6, wherein the second ions include at least one of sodium ($Na^+$) or potassium ($K^+$).

8. The method of claim 1, wherein an intensity of the electric field is in a range of about 100 volts per centimeter (V/cm) to about 1500V/cm.

9. The method of claim 1, wherein the molten salt includes at least one of sodium nitrate ($NaNO_3$) or potassium nitrate ($KNO_3$).

10. The method of claim 1, wherein the molding and chemical strengthening the glass article at the same time further comprises:

not applying the electric field to the glass article at a first time corresponding to a separate chemical strengthening; and applying the electric field to the glass article at a second time corresponding to a simultaneous molding and chemical strengthening.

11. The method of claim 1, wherein the molding and chemical strengthening the glass article at the same time further comprises:

applying a first electric field to the glass article; and applying a second electric field having an intensity different than an intensity of the first electric field to the glass article.

12. A method for manufacturing a glass article, the method comprising:

providing a chamber defining an inner space that accommodates a single volume of a molten salt and a plurality of electrodes in contact with the molten salt;

chemical strengthening surfaces of the glass article by immersing the glass article in the single volume of the molten salt disposed in the inner space of the chamber; and generating an electric field between the plurality of electrodes, wherein the electric field produces an asymmetrical effect on the chemical strengthening of the glass article, wherein an asymmetry of ions diffused into the surfaces of the glass article from the molten salt during the chemical strengthening simultaneously molds the glass article, wherein molding causes the glass article to change from a first planar shape to a second dome shape different from the first planar shape.

13. The method of claim 12, further comprising not applying the electric field to produce a symmetrical effect on the chemical strengthening of the glass article at a first time corresponding to the chemical strengthening, wherein the generating of the electric field is performed at a second time corresponding to the simultaneous molding and chemical strengthening of the glass article to produce the asymmetrical effect on the chemical strengthening of the glass article.

14. The method of claim 12, wherein the generating of the electric field between the plurality of electrodes further comprises:

applying a first electric field to the glass article; and applying a second electric field following the applying of the first electric field, the second electric field having an intensity different than an intensity of the first electric field to the glass article.

15. A method for manufacturing a glass article, the method comprising:

immersing the glass article having a first surface, a second surface, and a sidewall connecting the first surface and the second surface in a molten salt disposed in an inner space of a chamber, wherein the first surface, the second surface, and the sidewall contact the molten salt, wherein the molten salt is provided as a single volume; and molding and chemical strengthening the first surface, the second surface, and the sidewall of the glass article at a same time by applying an electric field to the glass article, wherein a first electrode in contact with the molten salt is disposed in the inner space of the chamber, a second electrode in contact with the molten salt and facing the first electrode is disposed in the inner space of the chamber, and in the immersing the glass article, at least a portion of the glass article is disposed between the first electrode and the second electrode, and wherein in the molding and chemical strengthening the glass article at a same time, a chemical strengthened thickness of the first surface of the glass article facing the first electrode is greater than a chemical strengthened thickness of the second surface of the glass article facing the second electrode, and the glass article is bent toward the first electrode.

16. The method of claim 15, wherein the molding and chemical strengthening the glass article at the same time further comprises:

applying, by the first electrode, a negative voltage to the glass article;

applying, by the second electrode, a positive voltage to the glass article; and concentrating first ions included in the glass article in at least a portion of the first surface of the glass article adjacent to the first electrode.

17. The method of claim 16, wherein the first ions include at least one of lithium ($Li^+$) and sodium ($Na^+$).

18. The method of claim 16, wherein the molding and chemical strengthening the glass article at the same time further comprises:

exchanging the first ions located in the first surface of the glass article with second ions included in the molten salt and having an ionic radius greater than an ionic radius of the first ions.

19. The method of claim 18, wherein the second ions include at least one of sodium ($Na^+$) or potassium ($K^+$).

* * * * *